(12) United States Patent
Jones

(10) Patent No.: US 12,553,154 B2
(45) Date of Patent: Feb. 17, 2026

(54) METHOD OF MANUFACTURING YARN AND YARN OBTAINED IN THAT MANNER

(71) Applicant: ALADDIN MANUFACTURING CORPORATION, Calhoun, GA (US)

(72) Inventor: Lucinda Jones, Calhoun, GA (US)

(73) Assignee: ALADDIN MANUFACTURING CORPORATION, Calhoun, GA (US)

( * ) Notice: Subject to any disclaimer, the term of this patent is extended or adjusted under 35 U.S.C. 154(b) by 166 days.

(21) Appl. No.: 18/287,753

(22) PCT Filed: Apr. 25, 2022

(86) PCT No.: PCT/US2022/026128
§ 371 (c)(1),
(2) Date: Oct. 20, 2023

(87) PCT Pub. No.: WO2022/226399
PCT Pub. Date: Oct. 27, 2022

(65) Prior Publication Data
US 2024/0191404 A1   Jun. 13, 2024

Related U.S. Application Data

(60) Provisional application No. 63/178,979, filed on Apr. 23, 2021.

(51) Int. Cl.
*B29C 48/92*    (2019.01)
*D01D 5/08*    (2006.01)
(Continued)

(52) U.S. Cl.
CPC .............. *D01D 5/08* (2013.01); *D01D 5/082* (2013.01); *D01D 5/088* (2013.01);
(Continued)

(58) Field of Classification Search
CPC .......... B29C 48/92; B29C 2948/92514; B29C 2948/92704; B29C 2948/92923;
(Continued)

(56) References Cited

U.S. PATENT DOCUMENTS

| 3,930,782 A | 1/1976 | Bigland |
| 4,025,595 A | 5/1977 | Mirhej |

(Continued)

FOREIGN PATENT DOCUMENTS

| CA | 2256050 A1 | 6/1999 |
| CN | 102959145 A | 3/2013 |

(Continued)

OTHER PUBLICATIONS

Non-Final Office Action issued in U.S. Appl. No. 17/413,356, mailed May 16, 2024.

(Continued)

*Primary Examiner* — Leo B Tentoni
(74) *Attorney, Agent, or Firm* — Meunier Carlin & Curfman LLC

(57) ABSTRACT

Method for manufacturing yarn, wherein said yarn comprises a plurality of continuous filaments, wherein said method comprises at least the following steps: —the step of spinning, preferably melt spinning, a plurality of continuous filaments; and—the step of treating said plurality of continuous filaments by means of a pressurized fluid supplied by two or more nozzles, and wherein one or more of said nozzles deliver said fluid at a varying pressure and/or rate and/or temperature.

18 Claims, 2 Drawing Sheets

Figure 1:
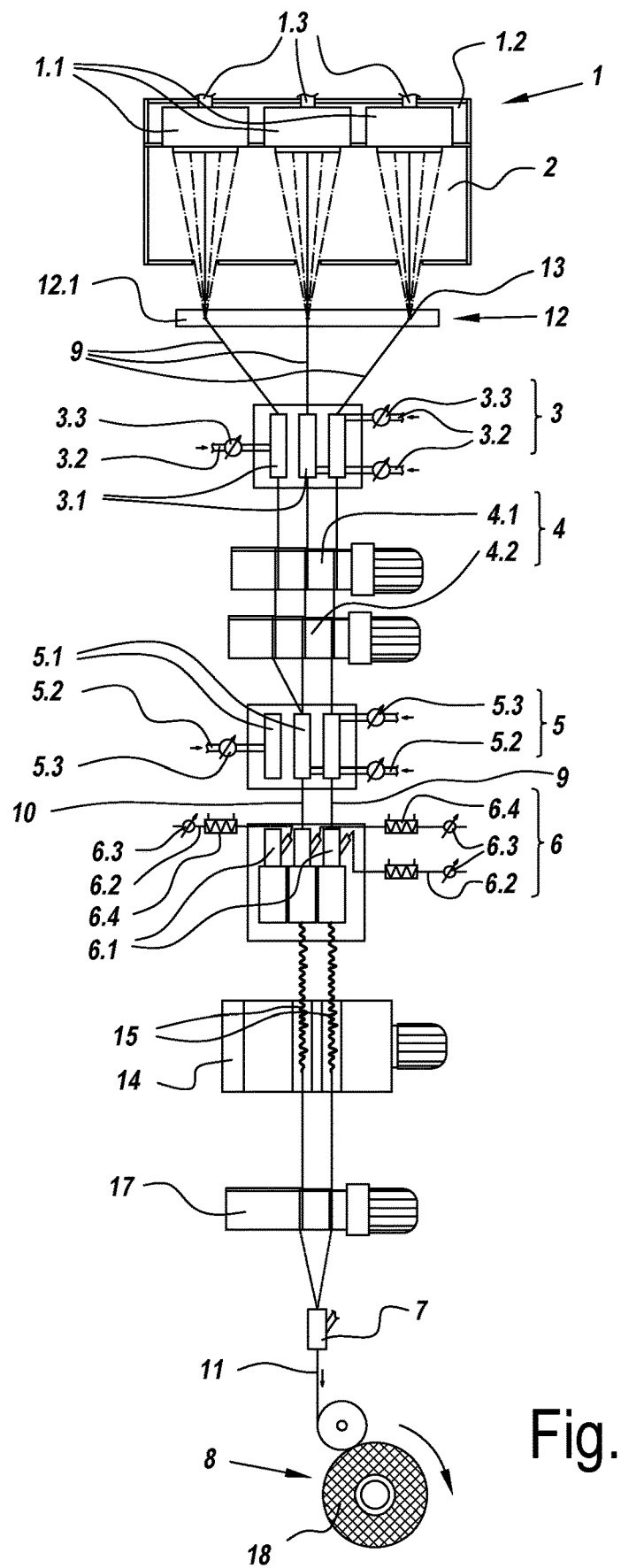

(51) Int. Cl.
*D01D 5/088* (2006.01)
*D01D 5/096* (2006.01)

(52) U.S. Cl.
CPC .............. *B29C 2948/92514* (2019.02); *B29C 2948/92704* (2019.02); *B29C 2948/92923* (2019.02); *D10B 2401/14* (2013.01)

(58) Field of Classification Search
CPC .......... D01D 5/08; D01D 5/082; D01D 5/088; D01D 5/096; D02G 3/22; D02G 3/24; D10B 2401/14
USPC .................. 264/40.1, 40.6, 103, 211.14, 555
See application file for complete search history.

(56) References Cited

U.S. PATENT DOCUMENTS

| | | | |
|---|---|---|---|
| 4,112,561 A | 9/1978 | Norris et al. | |
| 4,216,735 A | 8/1980 | McDaniel | |
| 4,708,619 A | 11/1987 | Balk | |
| 4,789,507 A | 12/1988 | Wesley et al. | |
| 5,131,918 A | 7/1992 | Kelley | |
| 5,160,347 A | 11/1992 | Kay et al. | |
| 5,234,650 A | 8/1993 | Hagen et al. | |
| 5,362,563 A | 11/1994 | Lin | |
| 5,549,957 A | 8/1996 | Negola et al. | |
| 5,834,089 A | 11/1998 | Jones et al. | |
| 5,902,531 A | 5/1999 | Berger et al. | |
| 5,958,548 A | 9/1999 | Negola et al. | |
| 5,996,328 A | 12/1999 | King et al. | |
| 6,076,345 A | 6/2000 | Weiss et al. | |
| 6,085,395 A | 7/2000 | Weiss | |
| 6,113,825 A | 9/2000 | Chuah | |
| 6,119,320 A | 9/2000 | Weiss | |
| 6,120,715 A | 9/2000 | Weigend | |
| 6,257,512 B1 | 7/2001 | Schoeck et al. | |
| 6,383,432 B1 | 5/2002 | Nakajima et al. | |
| 6,406,650 B1 | 6/2002 | Gross et al. | |
| 6,442,923 B1 | 9/2002 | Weiss et al. | |
| 6,900,547 B2 | 5/2005 | Polk Jr. et al. | |
| 7,086,130 B2 | 8/2006 | Jahns et al. | |
| 7,651,540 B2 | 1/2010 | Rao | |
| 7,845,923 B2 | 12/2010 | Lennemann et al. | |
| 8,182,550 B1 | 5/2012 | Hayes | |
| 8,398,389 B2 | 3/2013 | Stündl | |
| 8,597,553 B1 | 12/2013 | Clark | |
| 9,550,338 B2 | 1/2017 | Clark | |
| 2002/0073684 A1 | 6/2002 | Simmen | |
| 2003/0042651 A1* | 3/2003 | Najour ..................... | D04H 3/16 264/103 X |
| 2005/0008855 A1 | 1/2005 | Figuly et al. | |
| 2005/0048253 A1 | 3/2005 | Nord et al. | |
| 2005/0048281 A1 | 3/2005 | Royer et al. | |
| 2005/0106391 A1 | 5/2005 | Lawrence et al. | |
| 2006/0049542 A1 | 3/2006 | Chu et al. | |
| 2006/0144033 A1 | 7/2006 | Lee | |
| 2009/0208695 A1 | 8/2009 | Funatsu et al. | |
| 2010/0256319 A1 | 10/2010 | Pereira De Lacerda et al. | |
| 2010/0297442 A1 | 11/2010 | Kalies et al. | |
| 2012/0034838 A1 | 2/2012 | Li et al. | |
| 2013/0200544 A1 | 8/2013 | Hahm et al. | |
| 2013/0315029 A1 | 11/2013 | Helbing et al. | |
| 2015/0275400 A1 | 10/2015 | Tung | |
| 2018/0216259 A1 | 8/2018 | Hubert et al. | |
| 2018/0363239 A1 | 12/2018 | Love et al. | |
| 2019/0085483 A1 | 3/2019 | Clark | |
| 2019/0105283 A1 | 4/2019 | Anderson et al. | |
| 2019/0315962 A1 | 10/2019 | Booth et al. | |
| 2019/0360129 A1 | 11/2019 | Nasri et al. | |
| 2020/0102698 A1 | 4/2020 | Lu | |
| 2020/0115824 A1 | 4/2020 | Stündl et al. | |
| 2020/0291547 A1 | 9/2020 | Fischer et al. | |
| 2020/0324454 A1 | 10/2020 | Sauer | |
| 2021/0388539 A1 | 12/2021 | Cascio et al. | |
| 2021/0388540 A1 | 12/2021 | Cascio et al. | |

FOREIGN PATENT DOCUMENTS

| | | |
|---|---|---|
| GB | 1348923 A | 3/1974 |
| GB | 1275572 A | 5/1975 |
| JP | 3088597 B2 | 4/1995 |
| JP | 2005060850 A | 3/2005 |
| WO | 1995014806 A1 | 6/1996 |
| WO | 2001073189 A1 | 10/2001 |
| WO | 2007121696 A1 | 11/2007 |
| WO | 2009037118 A1 | 3/2009 |
| WO | 2015039971 A1 | 3/2015 |
| WO | 2020123127 A1 | 6/2020 |
| WO | 2021257733 A1 | 12/2021 |
| WO | 2021257738 A1 | 12/2021 |

OTHER PUBLICATIONS

International Search Report and Written Opinion issued in PCT/US2022/026128 mailed Jul. 29, 2022, 8 pages.
Non-Final Office Action issued in U.S. Appl. No. 17/349,696, mailed Nov. 8, 2024.
Non-Final Office Action issued in U.S. Appl. No. 17/349,731, mailed Apr. 3, 2024.
Non-Final Office Action issued in U.S. Appl. No. 17/349,696, mailed Mar. 14, 2024.
International Search Report and Written Opinion issued in PCT/US2021/037684, dated Nov. 1, 2021.
International Search Report and Written Opinion issued in PCT/US2021/037673, dated Nov. 9, 2021.
International Search Report and Written Opinion issued in PCT/US2021/037687, dated Nov. 1, 2021.
Terry, BCF—Bulk Continuous Filament Carpet Fiber, Feb. 5, 2018, [retrieved from the Internet on Aug. 2, 2021 at <https://www.baneclene.com/professionals/Content.aspx?xps=NTY1>] para 1.
International Search Report and Written Opinion issued in PCT/US2019/062873, dated Feb. 7, 2020.
Extended European Search Report completed Jul. 15, 2019 in related European application EP 19152387.7 (7 pages).
International Search Report and Written Opinion issued in PCT/US2021/063605, mailed Mar. 8, 2022, 15 pages.
Non Final Office Action issued in co-pending U.S. Appl. No. 17/349,699, mailed Aug. 17, 2023, 17 pages.
Non Final Office Action issued in co-pending U.S. Appl. No. 17/349,696, mailed Sep. 7, 2023, 10 pages.

* cited by examiner

METHOD OF MANUFACTURING YARN AND YARN OBTAINED IN THAT MANNER

CROSS-REFERENCE TO RELATED APPLICATIONS

This application is a U.S. National Stage application filed under 35 U.S.C. § 371 of PCT/US2022/026128, filed Apr. 25, 2022, which claims the benefit of U.S. Provisional Application No. 63/178,979, filed Apr. 23, 2021, the contents of which are incorporated herein by reference in their entireties.

The present invention is disclosed in the claims and concerns yarns and methods for manufacturing yarn.

The invention in particular concerns yarns obtained through a melt spinning method. The yarns may comprise polymer-based filaments, for example filaments of polyethyleneterephtalate (PET), polyamide, e.g. PA-6, polytrimethylene terephthalate (PTT) or polypropylene (PP). Filaments comprising different polymers may be combined into a single yarn. The filaments may be mono-, bi- or multi-component, may comprise a polymer blend or mix, for example by mixing a plurality of polymers in an extruder or by pre-compounding. The filaments may have a circular, oval, multilobal or any other cross-section.

In the production of multicolored yarns, a plurality of dissimilarly dyed and/or dyeable sub-threads are usually produced in a melt spinning process and collected so as to form a composite thread. A generic method as well as a generic melt spinning device for producing multicolored carpet yarns of this type are known, for example, from WO 2006/081844.

In WO '844, the sub-threads are interlaced multiple times prior to the crimping. So-called pre-interlacing herein takes place prior to the drafting of the sub-threads. Post-interlacing takes place after the drafting and prior to the crimping, wherein the post-interlacing nozzles are controllable in a mutually separate manner in order for the sub-threads to be separately interlaced. In this way, different color effects which in the composite thread lead to a mixed color or to multicolor effects can be implemented in the composite thread.

In order to meet the rapidly changing fashion trends and thus the ever changing requirements set for carpet yarns, there is in practice the desire to be able to produce composite threads of this type with high flexibility in a melt spinning process.

A method for generating a composite thread from a plurality of sub-threads in which the sub-threads are interlaced directly before and after texturizing is described in for example EP 0 861 931 A1. However, post-interlacing of the already textured sub-threads has the fundamental disadvantage that only limited mixing of filaments is possible by virtue of the texturized structure of the individual filaments. Moreover, the sub-threads after texturizing are usually cooled by way of a cooling medium such that the individual filaments of the sub-threads behave in a relatively rigid manner and in post-interlacing can thus be intermingled only by way of an increased input in terms of pressure.

US 2020/0115824 A1 discloses that it is known, in the production of multicolored carpet yarns, to produce a plurality of dissimilarly dyed filaments in a melt spinning process. These filaments are collected to form a composite yarn. Different color effects can be obtained in the yarn through treating the filaments by means of a fluid delivered from nozzles. The yarns of US '824 have uniform physical properties and quality.

The present invention in the first place aims to provide an alternative method of manufacturing yarn, wherein in accordance with preferred embodiments one or more problems with the yarns or the methods of the state-of-the art may be solved. In particular, the present invention seeks to provide a yarn with fluctuating properties along the length of the yarn.

In a practical embodiment of the present invention, the devices of US 2018/0216259 A1 or US 2020/0115824 A1, both incorporated by reference herein, may be used.

A first independent aspect of the present invention aims at providing a method for manufacturing yarn, wherein said yarn comprises a plurality of continuous filaments, said method comprising at least the following steps:

the step of spinning a plurality of continuous filaments; and the step of treating said plurality of continuous filaments by means of a pressurized fluid supplied by two or more nozzles, characterized in that one or more of said nozzles deliver said fluid at a varying pressure and/or rate and/or temperature.

The invention may have one or more advantages over what is known in that an individual treatment of the plurality of continuous filaments is possible in one or more treatment stages, for example in pre-interlacing, post-interlacing, or crimping. The plurality of continuous filaments may be treated separately or else conjointly, thereby achieving novel, and in particular varying color, varying structuring and/or other varying properties, which can be obtained along the length of the yarn.

By preference, said step of spinning a plurality of continuous filaments concerns melt spinning a plurality of continuous filaments.

According to a further or another embodiment, said one or more nozzles deliver said fluid at a varying rate. By preference, said one or more nozzles deliver said fluid at a varying rate at least in that said nozzles deliver said fluid intermittently. As a result of said intermittent fluid delivery, varying properties can be obtained along the length of the yarn, in particular intermittently activating fluid delivery creates separation or dominance, while intermittently deactivating fluid delivery creates muting or blending.

According to a further or another embodiment, said one or more nozzles deliver said fluid at a varying pressure. Said varying pressure may allow more complicated patterning along the length of the yarn.

According to some embodiments, additionally or alternatively, said varying pressure is comprised between 0,0 and 1.0 MPa (between 0 and 10 bar), more by preference between 0,0 and 0.8 MPa (between 0 and 8 bar), even more by preference between 0,0 and 0.6 MPa (between 0 and 6 bar).

According to some embodiments, additionally or alternatively, said varying pressure is comprised between 0,00 and 68.95 kPa (between 0 and 10 pounds per square inch), more by preference between 0,00 and 55.16 kPa (between 0 and 8 pounds per square inch), even more by preference between 0,00 and 41.37 kPa (between 0 and 6 pounds per square inch).

According to a further or another embodiment, said one or more nozzles deliver said fluid at a varying temperature.

In some embodiments, said one or more nozzles are controlled to deliver said fluid at said varying pressure and/or rate and/or temperature.

By preference, said one or more nozzles are controlled by means of a computer program. Said computer program may include one or more software components such as, for example, a computer-readable medium including computer executable instructions for performing a method associated with the above-mentioned embodiments. Said computer program may be loaded on a computing device. As used herein, "computing device" or "computer" may include a plurality of computers. The computing device may include one or more hardware components such as, for example, a processor, a random access memory (RAM) module, a read-only memory (ROM) module, a storage, a database, one or more input/output (I/O) devices, an interface, or combinations thereof. All of the hardware components listed above may not be necessary to practice the methods described herein. Said processor may be configured to execute instructions and process data to perform one or more functions associated with manufacturing yarn, in particular for performing a method associated with the above-mentioned embodiments. Said processor may be communicatively coupled to the RAM, the ROM, the storage, the database, the I/O devices, the interface, or combinations thereof. The computer program instructions may be loaded into the RAM for execution by the processor. Said database may include one or more software and/or hardware components that cooperate to store, organize, sort, filter, and/or arrange data used by the computer and/or processor. For example, the database may store computer readable instructions that cause the processor to adjust the pressure and/or rate and/or temperature of the pressurized fluid delivered by the one or more nozzles.

More by preference, said computer program is used to control said one or more nozzles to deliver said fluid at a pre-set sequence of different pressures, rates and/or temperatures. This pre-set sequence of different pressures may thus be comprised between 0,0 and 1.0 MPa (between 0 and 10 bar), more by preference between 0,0 and 0.8 MPa (between 0 and 8 bar), even more by preference between 0,0 and 0.6 MPa (between 0 and 6 bar), the pre-set sequence of different pressures may thus be comprised between 0,00 and 68.95 kPa (between 0 and 10 pounds per square inch), more by preference between 0,00 and 55.16 kPa (between 0 and 8 pounds per square inch), even more by preference between 0,00 and 41.37 kPa (between 0 and 6 pounds per square inch), the pre-set sequence of different rates may thus comprise an intermittent on/off sequence, and/or the pre-set sequence of different temperatures may thus be controlled.

According to a further or another embodiment, said computer program is used to control said one or more nozzles to deliver said fluid at a random sequence of different pressures, rates and/or temperatures. Similarly, said random sequence of different pressures may thus be comprised between 0,0 and 1.0 MPa (between 0 and 10 bar), more by preference between 0,0 and 0.8 MPa (between 0 and 8 bar), even more by preference between 0,0 and 0.6 MPa (between 0 and 6 bar), the random sequence of different pressures may thus be comprised between 0,00 and 68.95 kPa (between 0 and 10 pounds per square inch), more by preference between 0,00 and 55.16 kPa (between 0 and 8 pounds per square inch), even more by preference between 0,00 and 41.37 kPa (between 0 and 6 pounds per square inch), the random sequence of different rates may thus comprise an intermittent on/off sequence, and/or the random sequence of different temperatures may thus be controlled.

According to a further or another embodiment, said one or more nozzles deliver said fluid at a varying pressure and/or rate and/or temperature, in a manner independent from one another, each preferably in accordance with any of the preceding embodiments.

In some embodiments, said plurality of continuous filaments comprise filaments of different color and/or dyeability.

According to a further or another embodiment, said method further comprises a step of interlacing a plurality of said continuous filaments. More in particular, it may be possible that said step of interlacing comprises the sub-steps of pre-interlacing and post-interlacing. In some embodiments, the method also comprises a drafting step and/or a crimping step.

According to a further or another embodiment, said step of treating a plurality of said continuous filaments is performed prior to and/or after said step of interlacing a plurality of said continuous filaments. In some cases one or more nozzles of the interlacing step, in particular the pre-interlacing step and/or the post-interlacing step, may be controlled to deliver fluid at a varying pressure and/or rate and/or temperature. In the method according to the invention the interlacing step, in particular the pre-interlacing step and/or he post-interlacing step, may be performed by using rotating interlacing nozzles or by static interlacing nozzles. More intensive interlacing of the filaments may be obtained in particular by using rotating interlacing nozzles.

In some embodiments, said step of treating a plurality of said continuous filaments is preceded by a step of bundling a plurality of said filaments, wherein said step of interlacing is performed to interlace a plurality of said bundles.

Even more by preference, each of said bundles is exclusively assembled from filaments of a same color.

According to a further or another embodiment, said fluid is pressurized air. In some embodiments, said pressurized air is of a varying temperature. By preference, said pressurized air is of constant temperature.

According to some embodiments, the fluid of the invention may be pressurized steam, which may be of varying pressure, rate and/or temperature, and which may also vary in relative humidity (RH %).

According to some embodiments of the invention, yarns may comprise polymer-based filaments, for example filaments of polyethyleneterephtalate (PET), polyamide, e.g. PA-6, polytrimethylene terephthalate (PTT) or polypropylene (PP). Filaments comprising different polymers may be combined into a single yarn. The filaments may be mono-, bi- or multi-component, may comprise a polymer blend or mix, for example by mixing a plurality of polymers in an extruder or by pre-compounding. The filaments may have a circular, oval, multilobal or any other cross-section.

A second aspect of the present invention concerns a yarn obtained or obtainable through the method according to any one of the above-mentioned embodiments of the first aspect.

A third independent aspect of the present invention aims at providing a yarn comprising a plurality of continuous filaments, said filaments being treated in a varying manner over a length of said yarn, said length being at least 20 cm, and preferably at least 100 cm, or at least 1500 cm.

By preference, said yarn is obtained through a method in accordance according to any one of the above-mentioned embodiments of the first aspect.

A forth aspect of the invention relates to a carpet or rug comprising yarn according to any of the aforementioned of the second or third aspect, or obtained through a method in accordance with any of the embodiments of the first aspect.

Figure 2:
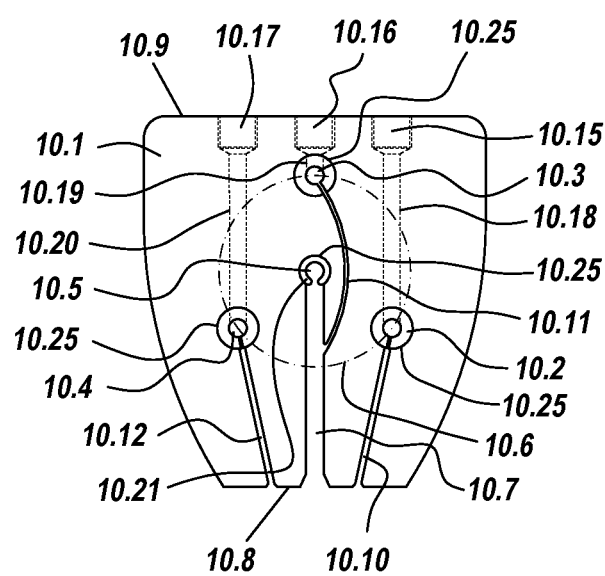

In order to better demonstrate the features of the invention, some preferred embodiments are described below, by way of example without any limiting character, with reference to the accompanying drawings, wherein:

FIG. 1 illustrates a schematic diagram of the device according to US '824 suitable for executing an exemplary method according to one embodiment of the invention, and FIG. 2 illustrates a schematic diagram of the device according to US '259 suitable for executing an exemplary method according to one embodiment of the invention.

FIG. 1 shows a device suitable for carrying out the invention, and corresponds to FIG. 1 of US '824, which illustrates that one or more or all of the nozzles 3.1-5.1-6.1 of respectively the pre-interlacing installation 3 and/or the post-interlacing installation 5 and/or the crimping installation 6 may be controlled to deliver fluid at a varying pressure, in accordance with claim 1 and/or any of the dependent claims.

The installations 3, 5 and 6 are comprised in a melt spinning device. In this example, the melt spinning device comprises a spinning installation 1, a cooling installation 2, a preparation installation 12, a pre-interlacing installation 3, a drafting installation 4, a post-interlacing installation 5, a crimping installation 6, an interconnecting installation 7, and a winding installation 8. In principle, the installations can be disposed below one another and/or beside one another. The spinning installation 1 is thus usually coupled to 2, 3 or more extruding installations so as to obtain three polymer melts in dissimilar colorations or dyeabilities or properties or denier or cross-section.

The spinning installation 1 in this exemplary embodiment has a spinning beam 1.2 which on the lower side thereof supports a plurality of spinning nozzles 1.1. The spinning beam 1.2 is in this case embodied so as to be heated. Each of the spinning nozzles 1.1 by way of a separate melt infeed 1.3 may be coupled to a plurality of spinning pumps (not illustrated here). A polymer melt can thus be extruded so as to form a multiplicity of filaments at each of the spinning nozzles 1.1. To this end, the spinning nozzles 1 on the lower sides thereof have a plurality of nozzle bores. As illustrated here a total of three or more spinning nozzles 1.1 so as to extrude three or more filament bundles of dissimilar colors are provided. To this end, the melt spinning device illustrated is particularly suitable for producing a so-called tricolor and/or tri-dyeable composite thread or yarn, or a so-called multicolor and/or multi-dyeable composite thread or yarn.

The cooling installation 2 by way of which the freshly extruded filaments are cooled is disposed, preferably directly downstream of the spinning installation 1. The filaments for cooling in the cooling installation 2 are preferably impinged with cooling air. The cooling air herein can be fed radially from the inside to the outside, transversely, or radially from the outside to the inside. The cooling installation 2 is assigned a preparation installation 12 and a plurality of collective thread guides 13 in order for the filaments after the cooling to in each case be collected so as to form bundles and to form a sub-thread 9 or bundle. The preparation installation 12 has at least one wetting means 12.1 in order for the sub-threads 9 to be conjointly prepared. However, there is also the possibility that the preparation installation 12 contains a plurality of wetting agents 12.1 so that each of the sub-threads 9 or bundles is capable of being separately wetted.

The treatment of the sub-threads 9 first takes place by the pre-interlacing installation 3. The pre-interlacing installation 3 has a plurality of pre-interlacing nozzles 3.1 which by separate compressed-air lines 3.2 and separate compressed-air actuating means 3.3 are coupled to a compressed-air source (not illustrated here). The pre-interlacing installation 3 in this exemplary embodiment possesses a total of three separate pre-interlacing nozzles 3.1 so that each of the sub-threads 9 or bundles could be imparted separate pre-interlacing in the pre-interlacing nozzles 3.1. The pre-interlacing installation 3 is followed by the drafting installation 4 which has a plurality of godets 4.1 and 4.2 for drafting the sub-threads 9. The godets 4.1 and 4.2 are preferably configured as godets which are wrapped multiple times, the godet jacket of said godets preferably being embodied so as to be heatable. The sub-threads 9 thus can first be thermally treated and drafted. It is to be expressly mentioned at this point that the configuration of the drafting installation 4 is exemplary. In principle, the drafting installation 4 can also have a plurality of godets in order for the sub-threads 9 or bundles to be drafted in a plurality of stages. The drafting installation 4 in the thread run is followed by the post-interlacing installation 5.

The post-interlacing installation 5 has a plurality of post-interlacing nozzles 5.1 which by a plurality of compressed-air infeed lines 5.2 and a plurality of compressed-air actuating means 5.3 are connected to a compressed-air source (not illustrated here). To this extent, the post-interlacing nozzles 5.1 can be separately controlled, wherein the respective setting of the compressed air is freely selectable, possibly as being variable in accordance with claim 1 or any of the dependent claims. In this exemplary embodiment, each sub-thread or bundle is likewise assigned a separate post-interlacing nozzle 5.1.

The post-interlacing installation 5 is in the example followed by the crimping installation 6.

The crimping installation 6 is embodied as a so-called stuffer box crimping unit and to this end has a plurality of texturizing nozzles 6.1. Each of the texturizing nozzles 6.1 is configured in two parts and has a conveying part and a staffing part so as to compress an infed thread to form a thread plug. The filaments herein are deposited in arcs and loops so that a crimp is created. To this end, the texturizing nozzles 6.1 by way of a plurality of supply lines 6.2 and a plurality of setting means 6.3 are connected to a fluid source (not illustrated here). The fluid herein by a plurality of heating means 6.4 can in each case be heated to a predetermined temperature in a manner separate for each texturizing nozzle 6.1. The respective setting means 6.3 herein are suitable for controlling the heating temperature of the fluid as well as the pressure of the fluid. To this extent, each of the texturizing nozzles 6.1 of the crimping installation 6 is separately controllable. The crimping installation 6 in this exemplary embodiment has three texturizing nozzles 6.1 so that each of the sub-threads 9 or bundles generated in the spinning installation 1 could be separately texturized, possibly in a varying manner in accordance with claim 1. The pre-interlacing nozzles 3.1 of the interlacing installation 3, the post-interlacing nozzles 5.1 of the post-interlacing installation 5, and the texturizing nozzles 6.1 of the crimping installation 6 in terms of the guiding cross section thereof are configured in such a manner that, alternatively to the sub-threads 9, a composite sub-thread 10 formed from a plurality of sub-threads 9 could also be treated. The production of a composite thread 11 in which all sub-threads 9 first are separately pre-interlaced by the pre-interlacing nozzles 3.1 in the pre-interlacing installation 3 is thus illustrated in the exemplary embodiment according to FIG. 1. After the drafting of the sub-threads 9, two of the sub-threads 9 are collected so as to form a composite sub-thread 10 and are post-interlaced in parallel with the third sub-thread 9 by two post-interlacing nozzles 5.1 in the post-interlacing installation 5. One of the post-interlacing nozzles 5.1 herein remains devoid of a function.

In the following crimping installation 6, likewise only two texturing nozzles 6.1 may be used herein in order for the composite sub-thread 10 and the third sub-thread 9 to be separately crimped. To this extent, dissimilar mixed colors can be generated in the later composite thread 11. The thread plugs 15 generated by the crimping installation 6 are cooled on the circumference of a cooling drum 14 and by a downstream take-off installation 17 are dissolved so as to in each case form a crimped composite sub-thread 10 and a crimped sub-thread 9. The crimped threads are subsequently collected in the interconnecting installation 7 so as to form the composite thread 11. The interconnecting installation 7 herein is preferably formed by an entanglement nozzle in which the sub-thread 9 and the composite sub-thread 10 are connected to one another by a plurality of entanglement knots.

At the end of the process, the composite thread 11 may be wound in the winding installation 8 so as to form a wound package 18. In the method according to the invention which is capable of being carried out by the melt spinning device illustrated in FIG. 1, a varying property of the yarn can be obtained along the length of the yarn.

The nozzles 3.1, 5.1 and/or 6.1 may be comprised in a device as illustrated in FIG. 2, which corresponds to FIG. 2 of US '259. The exemplary embodiment has a plate-shaped support 10.1. The plate-shaped support 10.1 holds a total of three nozzles 10.2, 10.3, and 10.4, which are disposed on a reference circle 10.6 at a uniform angular pitch. A thread guide 10.5 is held on the support 10.1 in the center of the reference circle 10.6. A guide groove 10.7 which penetrates the support 10.1 from a front end side 10.8 is assigned to the thread guide 10.5.

The entanglement nozzles 10.2 to 10.4 that are integrated on the support 10.1 are assigned a plurality of placing slots 10.10, 10.11, and 10.12. The placing slots 10.10 to 10.12 penetrate the support 10.1, wherein the placing slots 10.10 and 10.12 open out towards the front end side 10.8 of the support, and wherein the placing slot 10.11 of the entanglement nozzle 10.3 opens into the guide groove 10.7.

The entanglement nozzle 10.2 is formed by an insert member which is held in a receptacle opening 10.25 of the support 10.1. The receptacle opening 10.25 and the insert member 10.22 herein extend from an upper side of the support 10.1 and a lower side of the support 10.1.

A compressed air connector 10.15 which by way of a supply bore 10.18 is connected to the receptacle opening 10.25 is configured on a rear end side 10.9 of the support 10.1.

The device of FIG. 2 could be controlled to perform a method in accordance with the invention, for example in accordance with Tables 1, 2 or 3 here below, respectively relating to the programmed activation of each nozzle following an on/off pattern over time, and relating to the programmed delivery of random air pressure to a nozzle, or a combination of both for obtaining a more complicated patterning.

TABLE 1

Programming activation of each nozzle-ON/OFF over time.

| Nozzle | Time 1 | Time 2 | Time 3 | Time 4 | Time 5 | Time 6 | Time 7 | ... |
|---|---|---|---|---|---|---|---|---|
| 10-2 | ON | OFF | OFF | ON | OFF | ON | OFF | ... |
| 10-3 | OFF | ON | OFF | ON | ON | ON | OFF | ... |
| 10-4 | OFF | OFF | ON | OFF | ON | ON | OFF | ... |

TABLE 2

Programming random air pressure to a nozzle.

| Nozzle | Time 1 | Time 2 | Time 3 | Time 4 | Time 5 | Time 6 | Time 7 | ... |
|---|---|---|---|---|---|---|---|---|
| 10-2 | 6 psi | 1 psi | 4 psi | 0 psi | 3 psi | 0 psi | 2 psi | ... |

TABLE 3

Programming random air pressure to a nozzle.

| Nozzle | Time 1 | Time 2 | Time 3 | Time 4 | Time 5 | Time 6 | Time 7 | ... |
|---|---|---|---|---|---|---|---|---|
| 10-2 | 6 bar | 1 bar | 4 bar | 0 bar | 3 bar | 0 bar | 2 bar | ... |

In possibility 1, one or more nozzles deliver the fluid, more particularly air, at a varying rate at least in that said nozzles deliver said fluid intermittently. Herein, the programming ON creates separation or dominance, and the programming OFF creates muting or blending. In possibility 2 or 3, one (or more) nozzles deliver the fluid, more particularly air, at a varying pressure. Said varying pressure may be provided as a pre-set pattern, or as a randomized pattern.

Yarn obtained in accordance with the method of the invention may show a varying color over the length of said yarn. Preferably said variation is without repeat in a yarn length of at least 20 cm, or even better at least 100 cm, or at least 1500 cm.

The aspects and concepts disclosed in the claims and drawings may be combined with one another as long as they are not mutually contradictory. The present invention is by no means limited to the embodiments described above, however the method and yarn thereby obtained may be realized according to various variants without departing from the scope of the present invention.

What is claimed is:

1. A method for manufacturing yarn, comprising:
    melt spinning a length of a first plurality of continuous filaments and a length of a second plurality of continuous filaments;
    randomly treating the lengths of the first and second pluralities of continuous filaments with a first fluid and a second fluid;
        wherein a first nozzle treats the length of the first plurality of continuous filaments with the first fluid having a first fluid characteristic that is selected from the group consisting of a pressure, a rate, a temperature, and combinations thereof;
        a second nozzle treats the length of the second plurality of continuous filaments with the second fluid having a second fluid characteristic that is selected from the group consisting of a pressure, a rate, a temperature, and combinations thereof; and
    wherein each of the members of the groups of first and second fluid characteristics are independently controllable;
    wherein:
        randomly treating the length of the first plurality of continuous filaments comprises randomly activating and deactivating the first nozzle along the length wherein the member selected from the first fluid characteristic is randomly changed while treating the length of the first plurality of continuous filaments; and randomly treating the length of the second plurality of continuous filaments comprises randomly activating and deactivating the second nozzle along the length wherein the member selected from the second fluid characteristic is randomly changed while treating the length of the second plurality of continuous filaments.

2. The method of claim 1, wherein the length of the first plurality of continuous filaments is treated with the first fluid during a time period, wherein a first member selected from the group of the first fluid characteristics is changed during the time period.

3. The method of claim 2, wherein the length of the second plurality of continuous filaments is treated with the second fluid during the time period, wherein a first member selected from the group of the second fluid characteristics is changed during the time period.

4. The method of claim 3, wherein the change of the first member of the first fluid characteristic occurs at a different time than the change of the first member of the second fluid characteristic.

5. The method of claim 4, wherein the first member of the first fluid characteristic is different from the first member of the second fluid characteristic.

6. The method of claim 5, wherein the length of the first plurality of continuous filaments comprises filaments of a first color or dyeability, and the second plurality of continuous filaments comprises filaments of a second color or dyeability, and the length of the first color or dyeability is different from the second color or dyeability.

7. The method of claim 6, wherein the length of the first plurality of continuous filaments is wetted with wetting agents before being treated.

8. The method of claim 5, wherein the length of the first plurality of continuous filaments comprises a first sub-thread and a second sub-thread; wherein the first sub-thread comprises a first group of continuous filaments and the second sub-thread comprises a second group of continuous filaments; and wherein the first group of continuous filaments comprises filaments of a first color or dyeability, the second group of continuous filaments comprises filaments of a second color or dyeability, and the length of the second plurality of continuous filaments comprises filaments of a third color or dyeability.

9. The method of claim 1, wherein the length of the first plurality of continuous filaments is treated with the first fluid during a time period having a start time and an end time, and wherein the length of the second plurality of continuous filaments is not treated with the second fluid at either the start time or the end time but is treated with the second fluid for a portion of the time period.

10. The method of claim 9, wherein the length of the first plurality of continuous filaments is treated with the first fluid during the time period, wherein a first member selected from the group of the first fluid characteristics is changed during the time period.

11. The method of claim 10, wherein the length of the second plurality of continuous filaments is treated with the second fluid during the portion of the time period, wherein a first member selected from the group of the second fluid characteristics is changed during the portion of the time period.

12. The method of claim 11, wherein the change of the first member of the first fluid characteristic occurs at a different time than the change of the first member of the second fluid characteristic.

13. The method of claim 12, wherein the first member of the first fluid characteristic is different from the first member of the second fluid characteristic.

14. The method of claim 13, wherein the length of the first plurality of continuous filaments comprises filaments of a first color or dyeability, and the length of the second plurality of continuous filaments comprises filaments of a second color or dyeability, and the first color or dyeability is different from the second color or dyeability.

15. The method of claim 14, wherein the length of the first plurality of continuous filaments is wetted with wetting agents before being treated.

16. The method of claim 13, wherein the length of the first plurality of continuous filaments comprises a first sub-thread and a second sub-thread; wherein the first sub-thread comprises a first group of continuous filaments and the second sub-thread comprises a second group of continuous filaments; and wherein the first group of continuous filaments comprises filaments of a first color or dyeability, the second group of continuous filaments comprises filaments of a second color or dyeability, and the length of the second plurality of continuous filaments comprises filaments of a third color or dyeability.

17. The method for manufacturing yarn of claim 1, wherein the first nozzle and the second nozzle are rotating interlacing nozzles.

18. The method of manufacturing yarn of claim 5, wherein:
the length of the first plurality of continuous filaments and the length of a second plurality of continuous filaments are the same;
the length is at least 1500 cm; and
the yarn shows a varying color without repeat in the length.

* * * * *